(12) United States Patent
Sameshima et al.

(10) Patent No.: US 6,213,474 B1
(45) Date of Patent: Apr. 10, 2001

(54) PISTON RING AND COMBINATION OF COMPRESSION RINGS

(75) Inventors: Shuji Sameshima; Koji Takeuchi, both of Yono (JP)

(73) Assignee: Nippon Piston Ring Co., Ltd., Saitama (JP)

( * ) Notice: Subject to any disclaimer, the term of this patent is extended or adjusted under 35 U.S.C. 154(b) by 0 days.

(21) Appl. No.: 09/271,276

(22) Filed: Mar. 17, 1999

(30) Foreign Application Priority Data

Mar. 17, 1998 (JP) .................................................. 10-067481

(51) Int. Cl.$^7$ .................................................. C22C 38/18
(52) U.S. Cl. .................... 277/434; 277/443; 277/444; 277/447; 420/104; 420/105; 420/110
(58) Field of Search ..................... 277/434, 443, 277/444, 447; 428/667, 687; 148/325, 333, 334; 420/104, 105, 110, 111

(56) References Cited

U.S. PATENT DOCUMENTS

| 4,985,092 | * | 1/1991 | Kaede et al. | 148/325 |
| 5,906,896 | * | 5/1999 | Jackson et al. | 428/621 |
| 5,944,920 | * | 8/1999 | Fukushima | 148/325 |
| 6,054,225 | * | 4/2000 | Harayama et al. | 277/443 |

FOREIGN PATENT DOCUMENTS

58-25863  5/1983 (JP) .
61-54103  11/1986 (JP) .

* cited by examiner

Primary Examiner—Anthony Knight
Assistant Examiner—Enoch Peavey
(74) Attorney, Agent, or Firm—Birch, Stewart, Kolasch & Birch, LLP

(57) ABSTRACT

According to an aspect of the present invention, a piston ring for use in internal combustion engines is provided that is made of matensite-based stainless steel material containing C of not less than 0.4 and not more than 0.8 weight percent, Si of not less than 0.16 and not more than 0.4 weight percent, Mn of not less than 0.1 and not more than 0.4 weight percent, and Cr of not less than 2.0 and not more than 11.0 weight percent, where the steel material of the piston ring has mainly chromium carbide precipitated in the base texture thereof. The steel material of the first compression ring then has a nitriding layer formed thereon. According to another aspect of the present invention, a combination of compression rings, including a first compression ring 1 and a second compression ring 2, for use in internal combustion engines, is provided. The first compression ring 1 is made of martensite-based stainless steel material containing C of not less than 0.16 and not more than 1.4 weight percent, and Cr of not less than 12 and not more than 23.0 weight percent, where the steel material of the first compression ring 1 has mainly chromium carbide precipitated in the base texture thereof. The steel material of the first compression ring 1 then has a nitriding layer 11 of hardness of not less than Hv1050 formed thereon. The second compression ring 2 is made of the same steel material as the piston ring first described above, with mainly chromium carbide likewise precipitated in the base texture thereof The steel material of the second compression ring 2 then has a nitriding layer 22 of hardness of less than Hv1050 formed thereon. With the arrangement above, according to the present invention, piston rings have an advantage of excellent bending workability during the ring forming process. Likewise, a combination of first and second compression rings 1 and 2, has an advantage of reducing the total manufacturing cost of the combination of the compression rings, and an excellent abrasion resistance, with a second compression ring exhibiting excellent cold workability during the ring forming process.

8 Claims, 2 Drawing Sheets

PISTON RING AND COMBINATION OF COMPRESSION RINGS

FIELD OF THE INVENTION

The present invention relates to piston rings for use in internal combustion engines, and more particularly to piston rings, including compression rings and side rails of combined type oil rings, made of steel material suitable for gasoline engines and diesel engines, and to a combination of first and second compression rings made of steel material suitable for large diesel engines.

BACKGROUND OF THE INVENTION

Conventional piston rings, including compression rings and side rails of combined type oil rings, of gasoline and diesel engines, are made of martensite-based stainless steel with the surface thereof applied with nitriding treatment, to improve abrasion resistance. As for conventional first compression rings of large diesel engines, rings made of cast iron have been used with the external circumference thereof applied with chromium plating. When the EGR (exhaust gas recycling) system is employed in accordance with the exhaust gas regulations, however, the cast iron applied with chromium plating, comes to lack in sufficient abrasion resistance, whereby the first compression rings are required to improve the abrasion resistance thereof by having the rings made of martensite-based stainless steel, with the external circumference thereof applied with nitriding treatment.

As for second compression rings of large diesel engines, the operational environment in cylinders of the engines, is not so severe as the first compression rings. Nevertheless, a problem of insufficient abrasion resistance occurs in case of conventional rings using cast iron applied with chromium plating, when the EGR system is employed. Besides, when implementing axially thinner second compression rings to improve the engine fuel consumption, the cast iron rings come to lack in sufficient strength. The second compression rings are, therefore, also desired to be made of steel.

Compression rings made of steel are disclosed in Japanese Patent Publications No. 58-25863 (1983) and No. 61-54103 (1986), wherein the first and second compression rings are both provided to be made of an identical steel material.

In case of manufacturing piston rings, including compression rings and side rails of combined type oil rings, for use in internal combustion engines, including gasoline and diesel engines, made of steel material, a problem exists in that the bending work during the ring forming process, is not easy, and occasionally causes a broken ring.

As for compression rings used in large diesel engines, the compression rings, particularly, first compression rings, require a significantly high abrasion resistance, the rings are manufactured using relatively expensive high-Cr steel material. Thus, there has been another problem in that the total manufacturing cost of compression rings is caused expensive when the second compression rings are made of the same steel material as that of the first compression rings.

Moreover, there has existed a further problem in that, when the first and second compression rings are made of an identical steel material, and are applied with chromium plating of an identical hardness, then, the difference between the first and second compression rings, in the abutting gap thereof, grows abnormally great after a long time use, thereby resulting in the compression rings having their sealing capability decreased and causing the blow-by gas volume to increase.

Furthermore, an additional problem exists in that, since the second compression rings, used in large diesel engines, have a larger cross-sectional area than those used in in gasoline engines, the rings exhibit poor cold workability during the ring forming process.

SUMMARY OF THE INVENTION

The present invention has been made to solve the problems described above. Therefore, an object of the present invention is to provide piston rings, including compression rings and side rails of combined type oil rings, for internal combustion engines, including gasoline and diesel engines, made of steel material, such that, in manufacturing the rings, the bending work during the ring forming process, is made easy, whereby the rings are prevented from breakage at that time.

Another object of the present invention is to provide a combination of first and second compression rings, for large diesel engines, where the material and surface treatment of the second compression rings are degraded, considering the severeness of working conditions, and the difference therebetween, of the first and second compression rings, so that the total manufacturing cost of a combination of first and second compression rings is reduced, and their sealing capability is maintained for a long time, while also keeping an excellent abrasion resistance.

An additional object of the present invention is to provide second compression rings used in large diesel engines, exhibiting excellent cold workability during the ring forming process.

In order to accomplish the objects described above, piston rings, including compression rings and side rails of combined type oil rings, for use in internal combustion engines, including gasoline and diesel engines, are provided, according to one aspect of the present invention, where the piston ring is made of steel material advantageously containing C of not less than 0.4 and not more than 0.8 weight percent, Si of not less than 0.16 and not more than 0.4 weight percent, Mn of not less than 0.1 and not more than 0.4 weight percent, and Cr of not less than 2.0 and not more than 11.0 weight percent. Advantageously, the steel material has mainly chromium carbide precipitated in the base texture thereof, and then has a hardened layer formed thereon by means of surface treatment.

According to another aspect of the present invention, a combination of a first compression ring and a second compression ring, for use in internal combustion engines, including large diesel engines, is provided, where the first compression ring is advantageously made of steel material containing C of not less than 0.16 and not more than 1.4 weight percent, and Cr of not less than 12 and not more than 23.0 weight percent. Advantageously, the steel material of the first compression ring has mainly chromium carbide precipitated in the base texture thereof, and, then, has a hardened layer of hardness of not less than Hv1050 formed thereon by means of surface treatment.

The second compression ring is advantageously made of steel material containing C of not less than 0.4 and not more than 0.8 weight percent, Si of not less than 0.16 and not more than 0.4 weight percent, Mn of not less than 0.1 and not more than 0.4 weight percent, and Cr of not less than 2.0 and not more than 11.0 weight percent. Advantageously, the steel material of the second compression ring has mainly chromium carbide precipitated in the base texture thereof, and, then, has a hardened layer of hardness of less than Hv1050 formed thereon by means of surface treatment.

According to a further aspect of the present invention, the surface treatment described above, may be advantageously nitriding treatment, particularly, one nitriding treatment selected from the group consisting of gas nitriding treatment, gas soft-nitriding treatment, acid nitriding treatment, salting-in nitriding treatment, and ionitriding treatment.

According to a still further aspect of the present invention, advantageously, the surface treatment described above, may be a combination of a first treatment of nitriding treatment and a second treatment of either PVD plating treatment or composite plating treatment applied on the surface hardened with first treatment, of the piston ring, for gasoline and diesel engines, as described above, and the combination of the first and second compression rings, for large diesel engines.

According to another aspect of the present invention, as surface treatment for the piston ring of steel material, for gasoline and diesel engines, chromium plating may be applied to obtain an excellent abrasion resistance.

According to a still further aspect of the present invention, preferably, the first compression ring of the combination of compression rings may contain, in the steel material thereof, one or more elements that improve abrasion resistance thereof, particularly, one or more elements selected from the group consisting of Mo, Ni, and V.

Thus, according to the present invention, a piston ring, for use in internal combustion engines, including gasoline and diesel engines, is obtained that has an advantage in having excellent bending workability, thereby preventing rings from breakage during the ring forming process, and also a combination of first and second compression rings, for use in internal combustion engines, including large diesel engines, is obtained that has an advantage in reducing the total manufacturing cost of the combination of the compression rings, with the abrasion resistance maintained, thereby meeting demands from internal combustion engines for severe operating conditions.

DETAILED DESCRIPTION OF THE INVENTION

Figure 1:
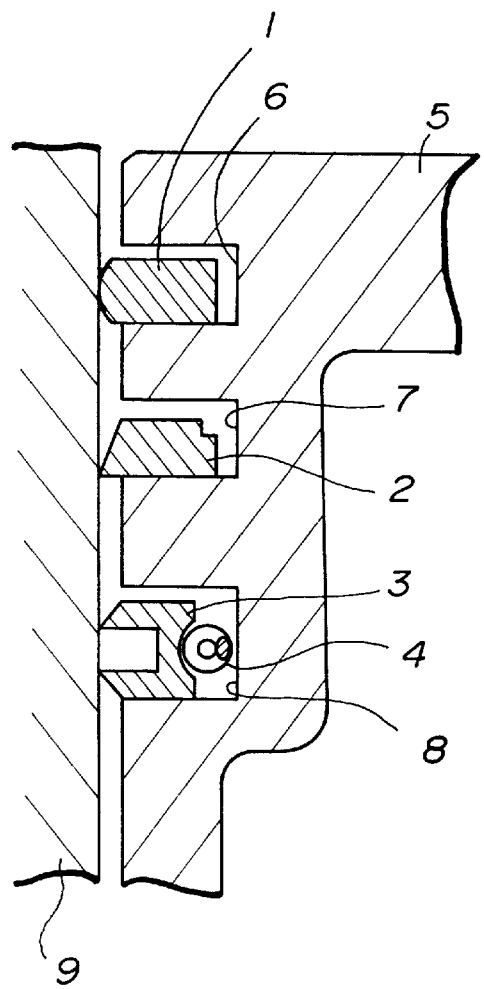
FIG. 1 is a cross-sectional view of a main portion of a diesel engine equipped with a combination of first and second compression rings, according to an embodiment of the present invention.

Piston rings, according to the present invention, as defined in claim 1 attached hereto, including compression rings and side rails of combined type oil rings, are made of steel material, specifically, martensite-based stainless steel, containing C of not less than 0.4 and not more than 0.8 weight percent, Si of not less than 0.16 and not more than 0.4 weight percent, Mn of not less than 0.1 and not more than 0.4 weight percent, and Cr of not less than 2.0 and not more than 11.0 weight percent, having mainly chromium carbide precipitated in the base texture thereof, and then having a hardened layer formed thereon by means of surface treatment. The reason of setting certain limitations on the element-containing ratios in the steel material of the piston ring, as above, is described hereunder.

The element C plays an important role in providing necessary hardness and strength to the ring material, and also contributes to improvement in the abrasion resistance by forming fine structure of hard chromium carbide. To obtain such effect, at least, or not less than, 0.4 weight percent of C must be contained in the steel material of the piston ring. When C is contained in excess of 0.8 weight percent, however, it comes to deteriorate the toughness and workability of the material during the ring forming process. Thus, advantageously, the lower and upper limits of the weight percent of C are set at 0.4 and 0.8 percent, respectively.

The element Si is added to the steel material of the piston ring, as a dioxidizer, and, for the purpose, at least, or not less than, 0.16 weight percent of Si is therefore required to be added in the steel material of the piston ring. When Si is added in excess of 0.4 weight percent, however, it comes to deteriorate the cold workability of the material during the ring forming process, and cause the toughness of the material to decrease. Thus, advantageously, the lower and upper limits of the weight percent of Si are set at 0.16 and 0.4 percent, respectively.

Similar to Si, the element Mn is added to the steel material of the piston ring, as a dioxidizer, and, therefore, at least, or not less than, 0.1 weight percent of Mn is required to be added in the steel material of the piston ring. When Mn is added in excess of 0.4 weight percent, however, it comes to deteriorate the cold workability of the material during the ring forming process, and cause the toughness of the material to decrease. Thus, advantageously, the lower and upper limits of the weight percent of Mn are set at 0.1 and 0.4 percent, respectively.

The element Cr, another important element contained in the steel material of the piston ring, in a state of solid solution, provides the thermal resistance and resistance against thermal fatigue failure (thermal fatigue resistance), and also improves the corrosion resistance. Portion of Cr forms a carbide, and provides the seize resistance and abrasion resistance. To exhibit such effect, considering the balance with C, at least, or not less than, 2.0 weight percent of Cr must be contained in the steel material of the piston ring. When Cr is contained in excess of 11.0 weight percent, however, it comes to deteriorate the workability of the material during the ring forming process. Thus, advantageously, the lower and upper limits of the weight percent of Cr are set at 2.0 and 11.0 percent, respectively.

The piston ring formed of the steel material described above, may be applied with one nitriding treatment selected from the group consisting of gas nitriding, gas soft-nitriding, acid nitriding, salting-in nitriding, and ionitriding treatments, as surface treatment, to form a nitriding layer on the surface of the piston ring. With this nitriding layer, the piston ring is enabled to exhibit an excellent abrasion resistance.

Moreover, the abrasion resistance of the piston ring may be further improved by applying either PVD plating or composite plating treatment, as a second or additional treatment, on the surface thereof hardened with the first treatment of nitriding, as surface treatment. Alternatively, to have an excellent abrasion resistance, the steel material of the piston ring, according to the present invention, may be applied with chrome plating on the surface thereof.

A combination of compression rings, according to the present invention, as defined in claim 6 attached hereto, includes a first compression ring and a second compression ring, where both the first and second compression rings may be made of steel material, specifically martensite-based stainless steel, containing C and Cr, having mainly chromium carbide precipitated in the base texture thereof, and then having a hardened layer formed thereon by means of surface treatment.

Advantageously, the element-containing ratios in the steel material of the first compression ring are not less than 0.16 and not more than 1.4 weight percent for C, and not less than 12.0 and not more than 23.0 weight percent for Cr. The reason of setting certain limitations on the element-containing ratios in the steel material of the first compression ring, as above, is described hereunder.

When the containing ratio is less than 0.16 weight percent for C, carbide that contributes to abrasion resistance, is not formed in volume enough to exhibit excellent abrasion resistance. On the other hand, when C-containing ratio exceeds 1.4 weight percent, carbide grows coarse, whereby the strength, necessary to a ring, decreases, causing a brittle ring. Thus, advantageously, the lower and upper limits of the weight percent of C are set at 0.16 and 1.4 percent, respectively.

As for Cr, when the containing ratio is less than 12.0 weight percent, then, depending on the percentage of C, carbide of high hardness that contributes to excellent abrasion resistance, is not formed in enough volume, and the corrosion resistance also decreases. On the other hand, when Cr-containing ratio exceeds 23.0 weight percent, then, again depending on the percentage of C, then, carbide in a state of solid solution in the base material, increases in volume, whereby the strength of the steel material, particularly, toughness, decreases. Thus, advantageously, the lower and upper limits of the weight percent of Cr are set at 12.0 and 23.0 percent, respectively.

Furthermore, the abrasion resistance of the first compression ring may be advantageously further improved by adding one or more elements, selected from the group consisting of Mo, Ni, and V, as additional components to the steel material of the first compression ring. Such addition also improves the corrosion resistance and thermal resistance of the ring.

The first compression ring formed of the steel material described above, may be applied with one nitriding treatment selected from the group consisting of gas nitriding, gas soft-nitriding, acid nitriding, salting-in nitriding, and ionitriding treatments, as surface treatment, to form a nitriding layer on the surface of the first compression ring, of a hardness of not less than Hv1050. With this nitriding layer, the first compression ring is enabled to exhibit an excellent abrasion resistance even under the severe working condition of a diesel engine employing the EGR system.

While it is physically possible to use the first compression ring formed according to the present invention, as a second compression ring of the same engine, since second compression rings have thermal and abrasion-wise working conditions less severer than that of first compression rings, then, a second compression ring may be advantageously formed of steel material containing Cr, that is relatively expensive, in a smaller weight percent than that of the steel material of the first compression ring described above, to reduce the total manufacturing cost of the combination of the first and second compression rings.

Thus, the second compression ring according to the present invention, is advantageously not made of the same steel material as that of the first compression ring, but made of steel material having the same element-containing ratios as the piston rings defined in claim 1 attached hereto and described above in detail, i.e., containing C of not less than 0.4 and not more than 0.8 weight percent, Si of not less than 0.16 and not more than 0.4 weight percent, Mn of not less than 0.1 and not more than 0.4 weight percent, and Cr of not less than 2.0 and not more than 11.0 weight percent, where the weight percent of Cr is set to be smaller than that of the steel material of the first compression ring. In addition, the steel material of the second compression ring has mainly chromium carbide precipitated in the base texture thereof.

The reason of setting certain limitations on the element-containing ratios in the steel material of the second compression ring, as above, is similar to the reason described earlier for piston rings defined in claim 1 attached hereto, and therefore is not described hereunder.

The second compression ring formed of the steel material made as described above, is applied with nitriding, as surface treatment, specifically one nitriding treatment selected from the group consisting of gas nitriding, gas soft-nitriding, acid nitriding, salting-in nitriding, and ionitriding treatments, as surface treatment, to form a nitriding layer on the surface of the second compression ring, of a hardness of less than Hv1050.

As described above, the steel material of the second compression ring, according to the present invention, has a composition degraded from that of the first compression ring such that the weight percent of Cr is decreased from that of the first compression ring, according to the present invention, and the nitriding layer formed on the surface of the second compression ring, according to the present invention, has a lower hardness than that of the first compression ring formed according to the present invention. Nevertheless, since the second compression ring has the thermal and abrasion-wise working conditions less severer than that of the first compression ring, then, the second compression ring is enabled to exhibit an excellent abrasion resistance even under the working conditions in a large diesel engine employing the EGR system,, and, at the same time, enabling to reduce the total manufacturing cost of a combination of first and second compression rings, compared with conventional combinations of compression rings of the same composition and the same surface treatment. Besides, using a combination of first and second compression rings of different compositions, according to the present invention, enables to prevent the difference between the first and second compression rings in the respective abutting gap thereof to grow abnormally great upon long use, which has been long experienced with a conventional combination of first and second compression rings of an identical composition and an identical surface hardness after surface treatment, thereby enabling to maintain the sealing characteristics of the compression rings.

As for the cross-sectional shape of the ring, the second compression ring is not required to have the same cross-sectional shape as that of the first compression ring, but may have a shape suitable for exhibiting the characteristics required thereof, such as tapered, tapered undercut, and tapered inner-cut shapes.

Moreover, the abrasion resistance of the first and second compression rings may be further improved by applying either PVD plating or composite plating treatment, as a second or additional treatment, on the surface thereof hardened with the first treatment of nitriding.

An illustrative embodiment of a combination of first and second compression rings, according to the present invention, will be described hereunder, referring to the accompanying drawings. FIG. 1 is a cross-sectional view of a main portion of a diesel engine equipped with an actual inventive sample of a combination of compression rings, as well as an oil ring, according to the present invention, where the engine has a piston 5 equipped with a first compression ring 1, a second compression ring 2, and an oil ring 3, of combined type including a space expander 4 and side rails (not specifically shown). Those rings 1, 2 and 3 are respectively fit in their respective ring grooves 6, 7 and 8, with their respective external circumferential surfaces in contact with the internal circumferential surface of the cylinder liner 9 of the engine.

Figure 2:
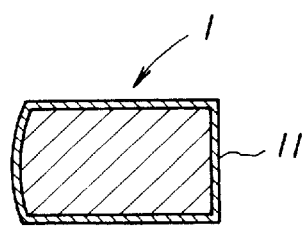
FIG. 2 is an enlarged cross-sectional view of the first compression ring shown in FIG. 1.

The first compression ring 1 is a ring having a cross-section of barrel shape, made of steel material, specifically martensite-based stainless steel, containing C of not less than 0.16 and not more than 1.4 weight percent and Cr of not less than 12.0 and not more than 23.0 weight percent. As shown in FIG. 2, the first compression ring 1 is applied with nitriding treatment so that the surface thereof is covered with a nitriding layer 11 having a hardness of not less than Hv1050.

Figure 3:
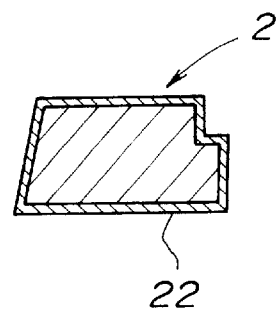
FIG. 3 is an enlarged cross-sectional view of the second compression ring shown in FIG. 1.

The second compression ring 2 of FIG. 2, is a ring having a cross-section of tapered shape, made of steel material, specifically martensite-based stainless steel, containing C of not less than 0.4 and not more than 0.8 weight percent, Si of not less than 0.16 and not more than 0.4 weight percent, Mn of not less than 0.1 and not more than 0.4 weight percent, and Cr of not less than 2.0 and not more than 11.0 weight percent. As shown in FIG. 3, the first compression ring 1 is applied with nitriding treatment so that the surface thereof is covered with a nitriding layer 22 having a hardness of less than Hv1050.

For the purpose of comparison, one each of first and second compression rings were manufactured, as actual comparative samples, from a conventional steel material for compression rings, to have the same shapes and sizes as the first and second compression rings 1 and 2. The comparative samples are applied with nitriding treatment to have a nitriding layer thereon, of the same hardness as the inventive samples.

Both the inventive and comparative samples were fully tested using an, actual diesel engine to measure their respective amount of abrasion. The test result is shown in FIG. 4.

Figure 4:
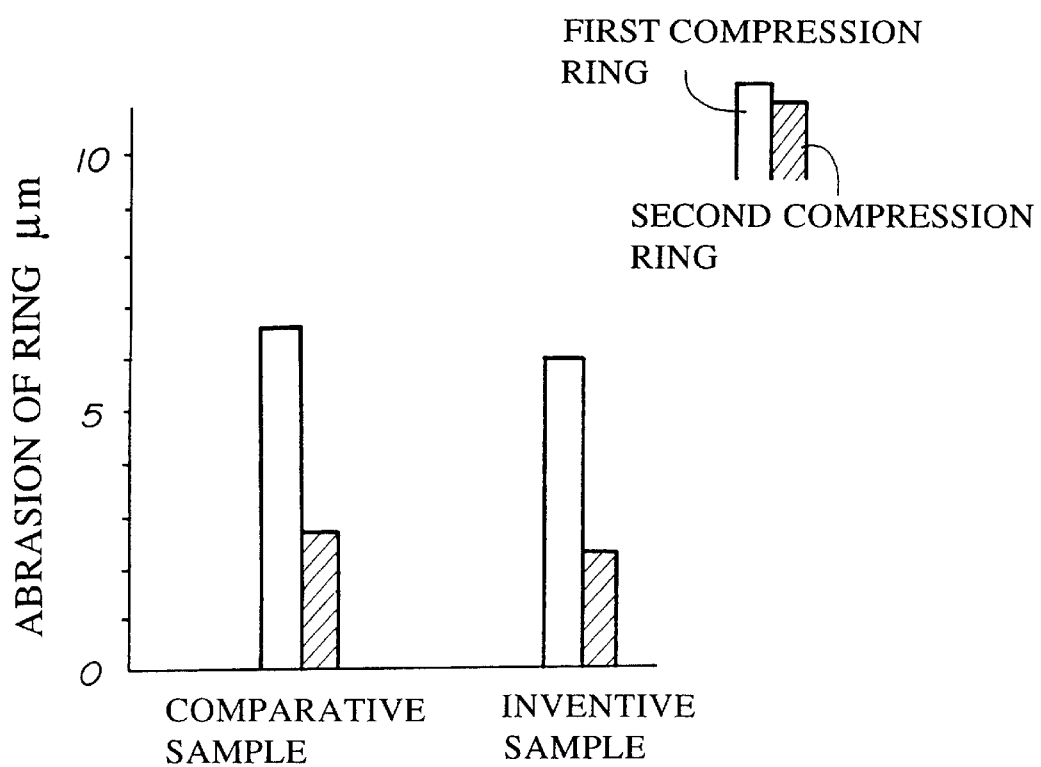
FIG. 4 is a graph showing a test result on abrasion resistance.

As seen from FIG. 4, the inventive samples, applied with nitriding treatment, exhibited an excellent abrasion resistance equal to that of the comparative samples, similarly applied with nitriding treatment.

Furthermore, when the cold workability during the ring forming process, was compared between the second compression rings of both the inventive and comparative samples, the inventive sample exhibited superior characteristics over the comparative sample, where the inventive sample showed outstanding workability, particularly, elongation of excellent uniformity, with no breaking failures and fluctuated windings during the winding working process.

Thus, as described above, unlike piston rings of conventional steel material, the piston rings, according to the present invention, have an advantage in that the bending work is easy to conduct, thereby preventing ring breakage during the ring forming process.

Also, the first and second compression rings, made of different martensite-based stainless steel materials containing Cr, with the second compression ring having a degraded steel material and a degraded surface hardness after surface treatment, both degraded from the first compression ring, according to the present invention, have an advantage in that the total manufacturing cost of such combination of compression rings is reduced, compared with conventional combinations of first and second compression rings, both using an identical steel material of an identical conventional composition and an identical surface hardness after surface treatment, such as nitriding, while maintaining the abrasion resistance of the first and second compression rings, according to the present invention, as excellent as that of such conventional first and second compression rings.

Furthermore, unlike the conventional second compression rings, the second compression rings, according to the present invention, have an advantage of exhibiting an excellent cold workability during the ring forming process.

While there have been shown and described fundamental novel features of the invention as applied to a preferred embodiment thereof, it will be understood that various modifications and changes to such embodiments may be made by those skilled in the art without departing from the spirit of the invention. It is our intention, therefore, to be limited only as indicated by the scope of the claims appended hereto.

What is claimed is:

1. A combination of compression rings, including a first compression ring and a second compression ring, for use in internal combustion engines, said first compression ring being made of steel material containing C of not less than 0.16 and not more than 1.4 weight percent, and Cr of not less than 12 and not more than 23.0 weight percent, said steel material of said first compression ring having mainly chromium carbide precipitated in the base texture thereof, said steel material of said first compression ring then having a hardened layer of hardness of not less than Hv1050 formed thereon by means of surface treatment, said second compression ring being made of steel material containing C of not less than 0.4 and not more than 0.8 weight percent, Si of not less than 0.16 and not more than 0.4 weight percent, Mn of not less than 0.1 and not more than 0.4 weight percent, and Cr of not less than 2.0 and not more than 11.0 weight percent, said steel material of said second compression ring having mainly chromium carbide precipitated in the base texture thereof, said steel material of said second compression ring then having a hardened layer of hardness of less than Hv1050 formed thereon by means of surface treatment.

2. A combination of compression rings according to claim 1, wherein said surface treatment is nitriding treatment.

3. A combination of compression rings according to claim 1, wherein said surface treatment is a combination of a first treatment of nitriding treatment and a second treatment of either PVD plating or composite plating applied on said surface hardened with said first treatment.

4. A combination of compression rings according to claims 1, 2 or 3, wherein said steel material of said first compression ring contains one or more elements that improve abrasion resistance thereof.

5. A combination of compression rings according to claim 2 or claim 3, wherein said nitriding treatment is one nitriding treatment selected from the group consisting of gas nitriding, gas soft-nitriding, acid nitriding, salting-in nitriding, and ionitriding treatments.

6. A combination of compression rings according to claim 4, wherein said one or more elements that improve abrasion resistance thereof, contained in said steel material of said first compression ring, are selected from the group consisting of Mo, Ni, and V.

7. A combination of compression rings according to claim 5, wherein said steel material of said first compression ring contains one or more elements that improve abrasion resistance thereof.

8. A combination of compression rings according to claim 7, wherein said one or more elements that improve abrasion resistance thereof, contained in said steel material of said first compression ring, are selected from the group consisting of Mo, Ni, and V.

* * * * *